US012065868B2

(12) United States Patent
Vautier

(10) Patent No.: US 12,065,868 B2
(45) Date of Patent: Aug. 20, 2024

(54) CONTROL AND DRIVE ASSEMBLY FOR A VEHICLE DOOR

(71) Applicant: FAIVELEY TRANSPORT TOURS, Saint-Pierre-des-Corps (FR)

(72) Inventor: Fabien Vautier, Veretz (FR)

(73) Assignee: Faiveley Transport Tours, Saint-Pierre-des-Corps (FR)

( * ) Notice: Subject to any disclaimer, the term of this patent is extended or adjusted under 35 U.S.C. 154(b) by 157 days.

(21) Appl. No.: 17/752,732

(22) Filed: May 24, 2022

(65) Prior Publication Data

US 2022/0381079 A1 Dec. 1, 2022

(30) Foreign Application Priority Data

Jun. 1, 2021 (FR) ....................................... 2105768

(51) Int. Cl.

| | |
|---|---|
| ***E05F 15/635*** | (2015.01) |
| ***B61D 19/02*** | (2006.01) |
| ***E05F 15/659*** | (2015.01) |

(52) U.S. Cl.

CPC .......... *E05F 15/635* (2015.01); *E05F 15/659* (2015.01); *B61D 19/02* (2013.01); *E05Y 2201/246* (2013.01); *E05Y 2201/434* (2013.01); *E05Y 2400/32* (2013.01); *E05Y 2900/506* (2013.01); *E05Y 2900/51* (2013.01); *E05Y 2900/531* (2013.01)

(58) Field of Classification Search

CPC ...... E05F 15/635; E05F 15/659; B61D 19/02; E05Y 2201/246; E05Y 2201/434; E05Y 2400/32; E05Y 2900/506; E05Y 2900/51; E05Y 2900/531; B61B 1/02

USPC ....................................................... 318/51, 34

See application file for complete search history.

(56) References Cited

U.S. PATENT DOCUMENTS 6,667,591 B2 * 12/2003 Mullet ................. G05B 19/042 318/460
6,734,648 B2 * 5/2004 Fukumura ............... E05B 81/20 318/434

FOREIGN PATENT DOCUMENTS

| | | | |
|---|---|---|---|
| AT | 522 747 | A1 | 1/2021 |
| DE | 199 13 996 | A1 | 9/1999 |
| EP | 1 912 846 | A1 | 4/2008 |
| EP | 2 404 805 | A1 | 1/2012 |

* cited by examiner

*Primary Examiner* — David Luo
(74) *Attorney, Agent, or Firm* — K&L Gates LLP

(57) ABSTRACT

A control and drive assembly for a transport vehicle door, and which includes a main control unit; a main motor to drive the door leaves and which is controlled by the main control unit to displace the leaves; an auxiliary control module; an auxiliary motor operable to: control the auxiliary motor so as to displace the leaves in at least one direction to a closed position, control a locking of the leaves in the closed position; and a connection device arranged between the main control unit and the auxiliary motor to facilitate transmission of a reference signal by the main control unit to the auxiliary control module, the reference signal being representative of a proper operating state of the main motor and the main control unit. The auxiliary control module is operable to actuate the auxiliary motor when the auxiliary control module does not receive the reference signal.

15 Claims, 4 Drawing Sheets

CONTROL AND DRIVE ASSEMBLY FOR A VEHICLE DOOR

CROSS-REFERENCE TO RELATED APPLICATIONS

The present application claims priority under 35 U.S.C. § 119 to French Patent Publication No. FR 2105768 (filed on Jun. 1, 2021), which is hereby incorporated by reference in its complete entirety.

TECHNICAL FIELD

The present disclosure relates to the field of access doors to a transport vehicle. These access doors can first of all designate doors belonging to transport vehicles, in particular of the train, tram, metro, a bus, or even a trolleybus. The disclosure relates to a transport vehicle door which may include, either a single leaf or several leaves, typically two leaves. Within the meaning of the disclosure, these access doors also designate doors called landing doors, also called platform screens. The disclosure relates to a transport vehicle door which may include either a single leaf, or several leaves, typically two leaves. Moreover, these access doors can be in particular of the sliding, or even sliding plug type.

The present disclosure relates more specifically to a control and drive assembly, intended to control each leaf belonging to such an access door. It further relates to a method for implementing this access door, via this control and drive assembly. Finally, it relates, on the one hand, to a transport vehicle and, on the other hand, to a platform screen which are respectively equipped with at least one such a control and drive assembly.

BACKGROUND

Conventionally, a door leaf is movable, in a direction of displacement which is most often horizontal, relative to the body of the vehicle that it equips. In a first position, (a closed position), this leaf closes off a bay in the body, while, in its open position, it releases access to this bay. This leaf is capable of being moved, typically thanks to an electric motor, in particular a rotary electric motor. According to a first possibility, this motor drives a worm screw which cooperates with an elongated cylindrical body, whose internal volume defines a nut meshing with the aforementioned worm screw. Moreover, as an alternative, provision can be made for the motor to drive a belt, each strand of which supports an arm allowing the displacement of a respective leaf.

The electric motor above is controlled by a pilot plate, or door control unit (DCU). This control unit manages, in addition to the opening and closing of each leaf, some additional functions. Among the latter, there are generally the locking of the leaf in the closed position, as well as the detection of obstacles during closing, the passenger anti-drive function, or even the transmission of the signals for opening and closing the doors.

In the case of a failure of the control unit, or else of the motor associated therewith, or even of the leaf drive chain, a leaf is likely to be blocked in an open position, which prevents any displacement of the transport vehicle. When such a breakdown is observed, it is then necessary to carry out a manual closing operation, from a member of the crew, in particular from the driver himself. It is understandable that this occurrence is problematic, insofar as it can significantly delay the departure of a vehicle stopped at the station, which then considerably disrupts the network. Moreover, this delay can take on prohibitive proportions, in particular in the case of transport vehicles called "driverless" transport vehicles, of high-capacity urban metros or even platform screen doors and landing doors.

In order to overcome the above problem, some manufacturers have proposed several architectures, aimed at adapting, in a judicious manner, the assembly for controlling and driving the door.

European Patent Application No. EP 1 912 846 suggests, in the case of failure of the control plate of a given door, to use the valid control plate used in theory to manage the neighboring door. This consequently allows closing, then locking, each leaf which is theoretically controlled by inoperative plate.

This solution has some drawbacks, however, given that it induces an increase in the failure rate of all the control plates, which must be likely to manage, in theory, an additional door. There is, moreover, an increase in the failure rate of the entire motorization since each motor, which is theoretically dedicated to a single control plate, must be able to be managed by two different plates. Furthermore, this creates a negative impact, in terms of safety, since there is a risk that a control plate inadvertently manages a non-defective door. It should also be noted that, according to the teaching of this European patent application, a possible motor failure is not taken into account.

Mention will also be made of European Patent Application No. EP 2 065 769, in the name of the company FAIVELEY TRANSPORT TOURS, which provides for the use of the control panel of a given door, for example, installed on the right, respectively left, side of the vehicle, for the opening and closing of the opposite door, installed on the right, respectively left, side of the vehicle. The control plate located on the first side, respectively left or right, is connected to an output module provided on the other side, respectively right or left. Consequently, the control plates located on these respective sides are managed by each other.

This alternative solution does not allow overcoming, in a satisfactory manner, the drawbacks of Patent Application No. EP 1 912 846 presented above. Thus, there is, in particular, an increase in the risk of failure not only of the control plates, but also of the overall motorization. In addition, just like in Patent Application No. EP 1 912 846, this second document does not take into account a possible motor failure. Furthermore, this alternative solution proves to be complex due to the reciprocal management between the control plates. Finally, it is only applicable for a couple of neighboring doors.

The Nabtesco company also proposed, in its European Patent Application No. EP 2 404 805, to associate an additional control plate with a given motor. This takes over in the case of failure of the usual control plate, in order to continue to operate the door in a normal manner.

This embodiment, however, is not entirely satisfactory, on the one hand, from an economic point of view. Indeed, the fact of installing an additional control plate involves a significant additional cost. There is also a risk of deterioration in the reliability, linked to the use of a specific electrical connection between the motor and the two control plates associated therewith. The presence of these additional connections, which allows in particular selecting the chosen control plate, indeed involves specific risk of failure. Finally, just as in the first two solutions, presented above, the Nabtesco embodiment does not allow overcoming a possible failure at the motor.

Finally, German Patent Publication No. DE 199 13 996 will be mentioned, which describes a control and drive assembly for a door using different motors. In particular, one of these motors is more particularly dedicated to a so-called rescue displacing the door, which corresponds to an emergency situation. However, this solution has specific drawbacks, in particular, in that it is relatively expensive. Moreover, this document does not specifically target the doors for transport vehicles.

SUMMARY

In view of the foregoing, an objective of the present disclosure is to overcome, at least partially, the drawbacks of the prior art mentioned above.

Another object of the disclosure is in particular to propose a control and drive assembly which allows carrying out, in a reliable manner, a rescue closing of the door, both in the case of a failure of the control plate and the drive motor or the coupling thereof.

Another object of the disclosure is to provide such a control and drive assembly which requires relatively inexpensive additional mechanical components, which are further adapted to ensure a rescue closing with a low energy expenditure.

Another object of the disclosure is to propose such a control and drive assembly, which allows avoiding any inadvertent maneuver, in particular in the case where the drive motor, the coupling thereof or the control unit are not in a failure situation.

Another object of the disclosure is to propose such a control and drive assembly, which can be implanted and implemented at a single door.

According to the disclosure, at least one of the above objectives is achieved via a control and drive assembly for a door of a transport vehicle, in particular, of the train, tram, metro, a bus, or even a trolleybus, this control and drive assembly comprising: a main control unit comprising an electronic control device; a main motor for driving the or each leaf of the door, the main control unit being operable to control the main motor so as to displace this leaf in two opposite directions, corresponding respectively to the opening and the closing of this leaf; an auxiliary control module; an auxiliary motor, the auxiliary control module being operable to control the auxiliary motor so as to displace the or each leaf in at least one direction, to a closed position of this leaf, the auxiliary control module being further operable to control the locking of the or each leaf, in its closed position; a connection device arranged between the main unit and the auxiliary motor, wherein the main control unit is operable to transmit, to the auxiliary control module, via the connection device, a reference signal representative of a proper operation of both the main motor, the main control unit, as well as the electronic control device, wherein the auxiliary control module is operable to actuate the auxiliary motor when the control module no longer receives the reference signal, wherein the auxiliary motor is operable to displace the or each leaf at an auxiliary displacement speed having a maximum value being significantly less than the maximum value of the displacement speed which is allowed by the main motor.

According to other technical features of the control assembly, in accordance with the disclosure: the ratio (V/V') between, on the one hand, the maximum value of the nominal displacement speed allowed by the main motor and, on the other hand, the maximum value of said auxiliary displacement speed, is greater than 1.5; the ratio (V/V') between, on the one hand, the maximum value of the nominal displacement speed allowed by the main motor and, on the other hand, the maximum value of said auxiliary displacement speed, is between 1.5 and 3; the maximum value of the auxiliary displacement speed (V') is less than 0.5 m/s; the maximum energy of the auxiliary motor is less than 18 Joules; the auxiliary control module is operable to actuate the auxiliary motor when it no longer receives any signal from the main control unit; the auxiliary control module is operable to actuate the auxiliary motor when it receives from the main control unit a signal which is different than the reference signal; the auxiliary control module is operable to control the auxiliary motor so as to displace the leaf in a single direction to its closed position; the connection device is of the wired type being in particular operable to transmit a variable signal of the periodic type; and the connection device is of the wireless type being in particular operable to transmit a variable signal of the incremental type.

These additional features can be implemented with the main object above, individually or in any technically compatible combination.

The disclosure also relates to a method for implementing a control and drive assembly, comprising the following: controlling the main motor according to a nominal displacement speed via a control unit, in order to carry out each opening and closing cycle of the or each leaf, when the auxiliary control module receives a reference signal representative of a proper operation of both the main motor, the main control unit, and the electronic control device, while leaving the auxiliary motor inactive; and controlling the auxiliary motor, via the auxiliary control module in response to a detection by an auxiliary control module detects of an absence of reception of the reference signal, so as to close the or each leaf, according to an auxiliary displacement speed which is significantly less than the nominal displacement speed.

According to additional technical features of this method: the method further comprises, before carrying out the first opening and closing cycle of the or each leaf, entering into an initialization phase in which the reference signal is transmitted at least once to the auxiliary module, via the control unit; and observing a time delay phase, after detecting the absence of reception of the reference signal via the auxiliary control module and before controlling the auxiliary motor. These additional technical features can be implemented with the second main object above, individually, or in any technically compatible combination(s).

The disclosure also relates to a transport vehicle, in particular, a train, tram, metro, a bus, or even a trolleybus, the vehicle including at least one door including at least one leaf, a displacement device operable to displace each leaf, and a control and drive assembly as set forth, illustrated, and disclosed herein.

The disclosure also relates to a platform for stopping a transport vehicle, in particular, a train, tram, metro, a bus, or even a trolleybus, the platform including at least one door including at least one leaf, a displacement device operable to displace each leaf, and a control and drive assembly as set forth, illustrated, and disclosed herein.

According to other technical features of this transport vehicle, or else of the stopping platform, the displacement device comprises: an elongated displacement member, in particular, a worm screw or a plurality of worm screws which are coupled to each other, the output shafts respectively of the main motor and of the auxiliary motor being engaged with the opposite ends of the elongated displacement member; an elongated displacement member, in particular, a worm screw or a plurality of worm screws which are coupled to each other, only the output shaft of the main motor being engaged with one of the ends of the elongated displacement member; and a closed-loop displacement member, in particular, a transmission belt and pulleys operable to cooperate with the closed-loop displacement member, the main motor being operable to drive a first pulley while the auxiliary motor is operable to drive a second pulley.

DRAWINGS

The disclosure will be described below, with reference to the appended drawings, given solely by way of non-limiting examples, in which.

DESCRIPTION

Figure 1:
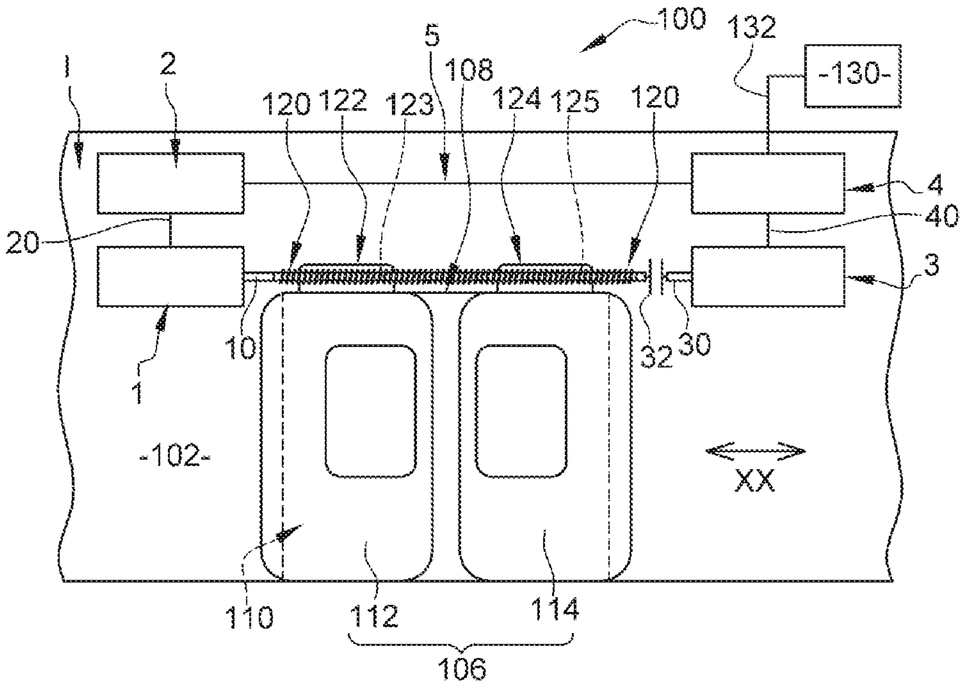
FIG. 1 is a front view, schematically illustrating a portion of a transport vehicle equipped with a control and drive assembly according to the disclosure.

FIG. 1 schematically illustrates a section of transport vehicle 100 which is equipped with a control and drive assembly according to the disclosure, which is designated by the reference I. This vehicle is for example a train, a tram, a metro, a bus or even a trolleybus. In this FIG. 1, only a section of the body 102 of this vehicle, as well as a door 106, are represented in a simplified manner. In a manner known per se, this door 106 is of the sliding type. It comprises a frame 108, disposed at the periphery of a bay 110 formed in the body of the vehicle 100. This door 106 is further provided with two leaves 112, 114, which form the door leaf. Alternatively, the door 106 can be provided with a single leaf, or with a plurality of leaves.

FIG. 1 also illustrates a drive device operable to drive each leaf 112, 114 relative to the frame 108 of the vehicle 100, in a direction denoted XX which corresponds to the running axis of the vehicle 100. This drive device comprises a drive member in the form of a worm screw 120, which is secured in translation with the frame. A member called driven member 122,124 is also provided, secured with a respective leaf 112, 114. Each driven member 122,124 is made in the form of a cylindrical body, whose internal surface forms a nut 123,125 operable to cooperate with the worm screw 120. The different mechanical elements, listed hereinabove, are of the conventional type such that they will not be described in more detail below.

Figure 3:
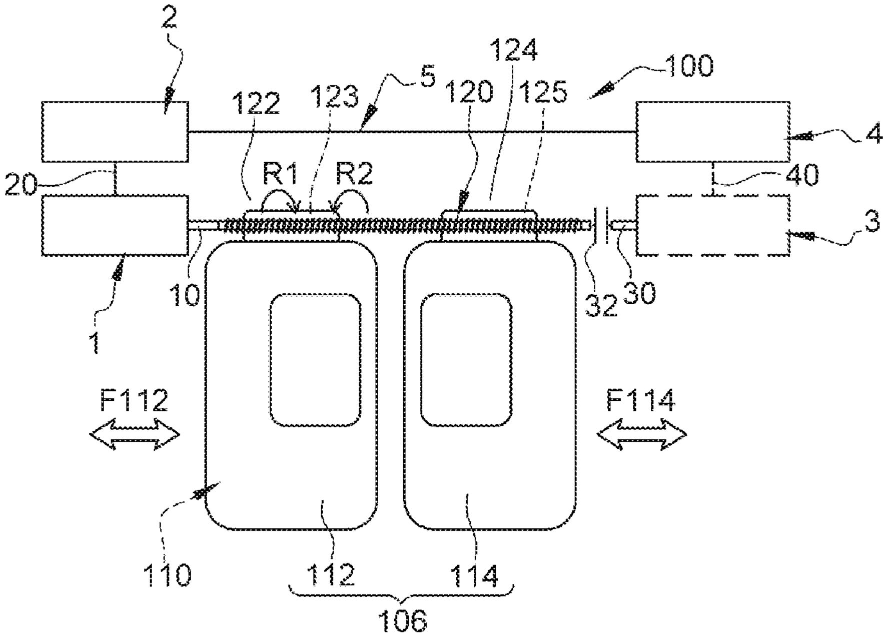
FIG. 3 is a front view, similar to FIG. 1, illustrating the implementation of the control and drive assembly according to the disclosure, in a normal configuration.
Figure 4:
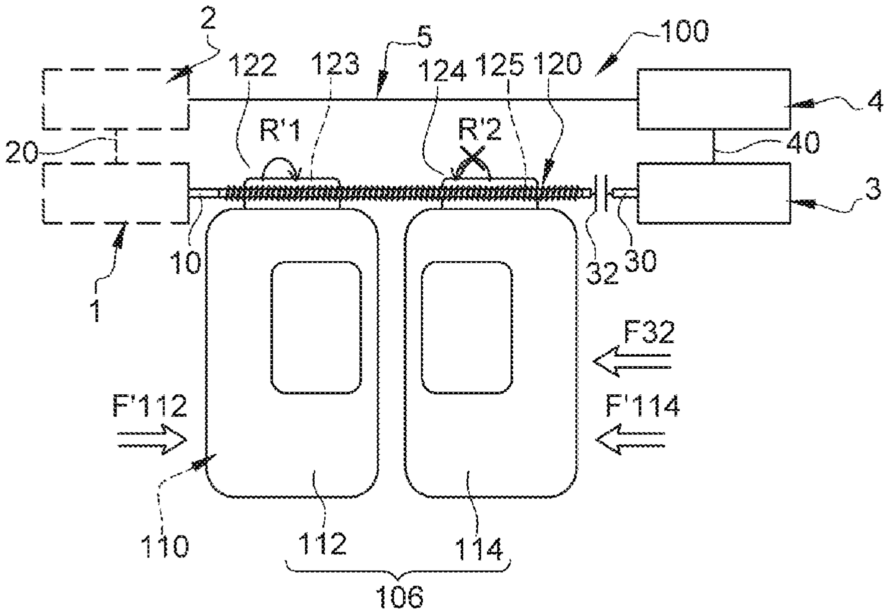
FIG. 4 is a front view, similar to FIG. 3, illustrating the implementation of the control and drive assembly according to the disclosure, in the case of a malfunction of the main motor or the main control unit belonging to this assembly.

The control and drive assembly I essentially comprises a main motor 1, a main control unit 2, an auxiliary motor 3, an auxiliary control module 4, and a connection device 5 arranged between the main control unit 2 and the auxiliary control module 4. The main motor 1, which is known per se, is typically a direct current rotary motor. Alternatively, the main motor 1 could also be a brushless motor or a stepper motor. In FIGS. 1, 3, and 4, the output shaft 10 thereof is represented schematically. The output shaft 10 cooperates with the worm screw 120 so as to drive it in rotation. The main motor 1 has performance such that it allows a displacement of each leaf 112, 114 along the axis XX above, at a speed V typically comprised between 0.1 and 1 meter per second (m/s).

The main control unit 2, which is also known per se, is equipped with an electronic control device 22 that comprises one or more software, in a conventional manner. The main control unit 2 is operable to control the main motor 1 via a control line 20. In particular, the main control unit 2 causes rotation of the output shaft 10 in opposite directions, which enables a displacement of the leaves 112, 114 both in the closing direction and in the opening direction. In addition to causing the opening and closing functions, the main control unit 2 is operable to perform additional functions, in a conventional manner. Among these main functions, mention will be made in particular of the locking of one (or both) of the leaves 112, 114 in the closed position, as well as the detection of obstacles during closing, the passenger anti-drive function, or even the transmission of signals for opening and closing the leaves 112, 114. Typically, the main control unit 2 is similar to the control plates (or Door Control Units) known from the state of the art, which have been detailed in the preamble of this disclosure.

The auxiliary motor 3, which is also known per se, is typically also a direct current rotary motor, a brushless motor, or even a stepper motor. In FIGS. 1, 3, and 4, the output shaft 30 thereof is represented schematically. The output shaft 30 cooperates with the worm screw 120 to also drive the worm screw 120 in rotation, in particular, in certain operational circumstances which will be detailed hereinbelow. A clutch member 32 is advantageously interposed between the output shaft 30 and the worm screw 120, such that the auxiliary motor 3 is not permanently engaged with the worm screw 120, in particular, during a normal operation as will be detailed hereinbelow.

According to the disclosure, the maximum displacement speed V' of each leaf 112, 114, which is called auxiliary since it is allowed by starting the auxiliary motor 3, is substantially less than the maximum speed V which is called nominal since it is allowed by the main motor 1. In other words, the ratio (V/V') between the above nominal and auxiliary speeds is much greater than 1. Advantageously, the maximum auxiliary speed V' is in all cases less than 0.5 m/s.

Advantageously, the auxiliary motor 3 has performances which are significantly lower than those of the main motor 1. In particular, the ratio (E/E'), between the respective maximum energies of the main motor 1 and the auxiliary motor 3, is much greater than 1. Advantageously, the maximum energy E' of the auxiliary motor 3 is in all cases less than 18 Joules.

The auxiliary control module 4, which is operable to control the auxiliary motor 3 via a control line 40, is advantageously of a type different from that of the main control unit 2. In particular, the auxiliary control module 4 has a number of reduced functionalities, relative to those authorized by the main control unit 2. In this respect, provision can advantageously be made for the auxiliary control module 4 to only control, on the one hand, the displacement of each leaf 112, 114 towards a respective closed position and, on the other hand, a respective locking of each leaf 112, 114 relative to the frame 108 in the closing position. It will be noted that, in the event that the locking mechanism normally dedicated to this function is damaged, an emergency lockout, of the conventional type, is activated following the command generated by the auxiliary control module 4.

The connection device 5, which is illustrated schematically in FIGS. 1, 3, and 4, can be made in different forms. It is possible, in particular, to provide wired-type connection device 5 such as a binary input/output, which then take the form, for example, of a cable or a set of cables. Alternatively, it is also possible to provide a connection device 5 of an electronic network type, for example, a network of the CAN (Controller Area Network) type or of the ETHERNET type. Another variant may include using a wireless connection, for example, of the Wi-Fi® or Bluetooth® type.

In accordance with the disclosure, the main control unit 2 transmits in service, via the connection device 5, a signal in the direction of the auxiliary control module 4. This signal is representative of an operating level of the main motor 1, namely that it may be representative of a proper operation of the main motor 1, or else of an incorrect operation of the main motor 1.

Figure 2:
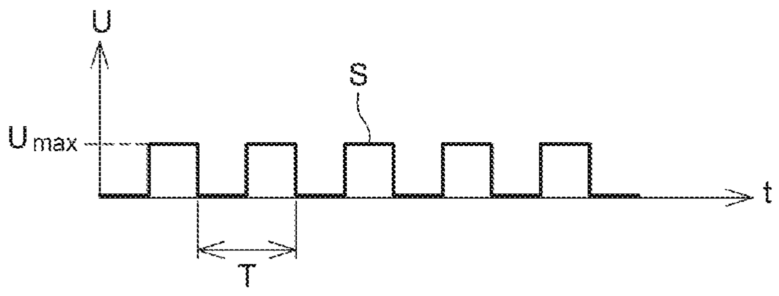
FIG. 2 is a graph, illustrating a signal transmitted by a main control unit, belonging to the assembly according to the disclosure.

In the case of a network of the wired type, the reference signal is representative of a proper operation of the main motor 1, can be such as that described in FIG. 2, where it is assigned the reference S. This constitutes a square signal, transmitted at a constant frequency, materializing the variation of a voltage as a function of time. By way of example, the amplitude Umax of this voltage is, for example, between 0 and 137 V. Typically, this maximum amplitude can have one of the following values: 3.3 V, 5 V, 12V or 24 V, 72 V, or 110 V. Moreover, the period T of the signal is, for example, between 10 ms and 1 s, typically in the range of 100 ms.

In the case of a network or wireless type connection, the signal called reference signal, representative of the proper operation of the motor, is materialized by the incrementation, via the main unit, of a counter present on the auxiliary module. This counter is incremented at a period for example comprised between 10 ms and 1 s, typically close to 100 ms.

In the case where several processors and/or software are used, on the one hand, the reference signal in the wired configuration, on the other hand, the counter in the wireless configuration, correspond to the results of the different states of this plurality of processors and/or software. In other words, the reference signal just like this counter are representative of the proper operation of both the motor, the software and the main control unit 2.

The implementation of the control and drive assembly I in accordance with the disclosure, as described above, will now be explained, in particular with reference to FIGS. 2 and 3.

Advantageously, an initialization phase is first carried out. In essence, the main control unit 2 transmits at least once, to the auxiliary control module 4, the signal representative of the proper operation of the motor and the control unit thereof. As seen above, this signal can take different forms depending on whether the connection device 5 are of the wired or wireless type. Once this initialization phase has been carried out, the auxiliary control module 4 is then capable of identifying the transmission, either of the signal representative of the proper operation, or of a different signal which is therefore representative of an incorrect operation. It will also be noted that this auxiliary control module 4 is capable of identifying the pure and simple absence of transmission of any signal, from the main control unit 2.

In this regard, it will be noted that it is particularly advantageous to provide a reference signal which is variable, namely of a dynamic type and not static type. In other words, the reference signal changes values over time. This temporal change allows identifying a possible malfunction of the main control unit 2, due to the fact that the main control unit 2 would be frozen. Consequently, it is a signal called life signal of the main control unit 2.

FIG. 3 illustrates a normal operation of the door 106, as well as of its control and drive assembly. In FIG. 3, the active mechanical and electrical elements are represented in solid lines, while the inactive elements are represented in dotted lines. During normal operation, the main control unit 2 manages the usual functions assigned thereto. In particular, the main control unit 2 controls the main motor 1 such that the output shaft 30 thereof and, consequently, the worm screw 120, can be rotated in opposite directions. In FIG. 3, R1 denotes the direction of rotation corresponding to the closing of the doors 106, as well as R2 the reverse direction of rotation corresponding to the opening of the doors 106. These movements of the leaves 112, 114 in opposite directions are materialized, in FIG. 3, by double arrows F112 and F114. It will be noted that, during this normal operation, the auxiliary motor 3 does not mesh with the worm screw 120, due to the presence of a clutch member 32.

It is now assumed that there is a malfunction, at the door 106 and/or the control and drive assembly thereof. Such a malfunction can correspond to different occurrences. First of all, it can be a motor failure, the detection of a door leaf 112, 114 which is not correctly closed, or else a leaf 112, 114 which is locked without being correctly closed. This malfunction can also be in the form of an electrical or electronic type problem, which is to say, in particular a software failure. This malfunction can further mean a problem at the periodic tests, also called "auto tests," which are conventionally carried out by the main control unit 2. These tests are intended to check the proper operation in real time of the main control unit 2 itself, or of the entire door 106. This may include, among other things, consistency tests at sensor or else contact tests.

Such a malfunction, therefore, can mainly be representative of an incorrect operation of: either of the main motor 1, either of the main control unit 2 (hardware), or at least one of the software forming the electronic control device 22 for controlling the main control unit 2.

Such a malfunction is then detected, at the auxiliary control module 4. In the case where the main control unit 2 detects a motor failure, it stops the transmission of the reference signal. The auxiliary control module 4 then identifies this absence of transmission, such that it concludes with the malfunction hereinabove. In the case where the failure occurs at the main control unit 2 itself, the main control unit 2 can either continue to transmit a signal which is, however, different than the reference signal, or no longer transmit a signal. This occurrence is then identified by the auxiliary control module 4 as a malfunction. Once the malfunction is identified, either by the absence of a signal, or by the transmission of a signal which is not in accordance with the reference signal, the auxiliary control module 4 activates the auxiliary motor 3, which is illustrated in FIG. 4. As in FIG. 3, FIG. 4 illustrates, respectively in solid and dotted lines, the mechanical and electrical elements which are respectively active and inactive.

As shown in FIG. 4, the auxiliary control module 4 controls the clutch 32 so as to mutually engage the output shaft 30 of the auxiliary motor and the worm screw 120, which is materialized by the arrow F32. This output shaft 30 is then rotated, just like the worm screw 120. This rotation, materialized by the arrow R'1, then causes the leaves 112, 114 to close, which is materialized by the simple arrows F' 112 and F' 114.

In order to avoid an action which is too sensitive, the command implemented by the auxiliary control module 4 can intervene after a time delay. In other words, a predefined duration is provided between, on the one hand, the moment when the absence of transmission of the reference signal is detected and, on the other hand, the moment when the auxiliary control module 4 executes its own command.

Advantageously, provision can be made for the closing command from the auxiliary control module 4 to be limited to a certain time period, typically comprised between 1 s and 10 s. This allows avoiding potential conflicts between the auxiliary control module 4 and the main control unit 2, in the event that this auxiliary control module 4 detects a failure of the main motor 1 or of the main control unit 2, while the main motor 1 and the main control unit 2 are in a state of proper operation. This also allows reducing the risk of passengers being trapped when they actuate the emergency opening device.

The auxiliary control module 4 is also operable to control the locking of the leaves 112, 114 once they have reached a closing position as mentioned hereinabove. This locking can be of an active locking type, in the sense that it is carried out by the auxiliary motor 3 at the end of the closing movement. It is also possible for the locking to be in a passive locking type which locking is induced by the movement of the door itself, without additional action of the auxiliary motor 3. In either of these cases, this locking remains controlled by the auxiliary control module 4.

The detected malfunction may be temporary. In this case the normal implementation of the leaves 112, 114, in particular, with regard to the opening and closing cycles, is again carried out via the main control unit 2 and the main motor 1. Should, however, the detected malfunction prove to be long-lasting, appropriate repairs should be made to the main control unit 2 and/or the main motor 1. It will be noted that, in the case where the main control unit 2 is in normal operation, the successive locking then closing commands can be ordered to the auxiliary control module 4 via the main unit 2.

In FIG. 1, the on-board cabin 130 has been schematically illustrated. Optionally, an additional control line 132 advantageously connects the on-board cabin 130 and the auxiliary control module 4. Under these conditions, independently of the steps described above, the driver or even any member of the crew can actuate the auxiliary control module 4, should it be necessary. This occurrence can in particular occur when the crew observes a failure in the door 106 or else in the control and drive assembly, the cause of which cannot be easily identified.

It will further be emphasized that, advantageously, the output shaft 30 cannot be rotated in the opposite direction, this impossibility being materialized by the crossed-out arrow R'2 visible in FIG. 4. In other words, the auxiliary motor is not capable of generating an opening of the leaves 112, 114 of the door 106. This allows reducing the dimensions and performance of the main motor 1, which is advantageous in terms of space and costs. It should be noted that the above impossibility is beneficial in terms of safety with regard to the risks of inadvertent opening, whereas it is also not likely to impact the proper operation of the entire railway network.

In a first embodiment, the clutch 32 is optional. Indeed, it is possible to imagine that the output shaft 30 is permanently engaged with the worm screw 120. In this case, when the latter is driven by the main motor, this worm screw 120 meshes with the auxiliary motor 3, which is switched on passively. Nevertheless, the use of the clutch 32 is advantageous, insofar as it allows reducing the wear of the auxiliary motor, given that the latter is then completely inactive in normal operation of the door 106. This clutch also allows reducing the manual efforts to open and close the leaves 112, 114 of the door 106.

Figure 5:
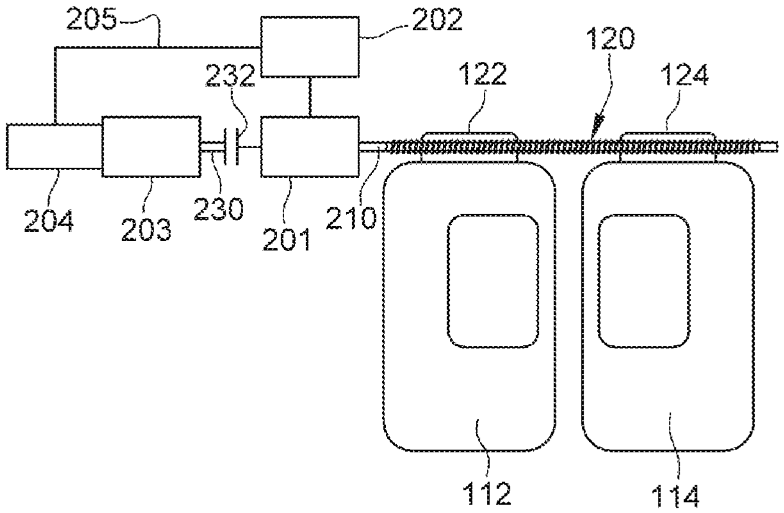
FIG. 5 is a front view, similar to FIG. 1, illustrating a control and drive assembly according to a second embodiment of the disclosure.

FIG. 5 illustrates a second embodiment of the disclosure. In this FIG. 5, the mechanical elements of the control and drive assembly, which are similar to those of the previous figures, are assigned the same reference numbers, increased by the number 100.

The control and drive assembly represented in FIG. 5 differs from that of the preceding figures, in particular, in that the output shaft 230 of the auxiliary motor 203 does not cooperate directly with the worm screw 120. Indeed, the auxiliary motor 203 is placed opposite the worm screw 120 relative to the main motor 201. The output shaft 230 of the auxiliary motor 203 therefore cooperates with the input of the main motor 201, with the interposition of a clutch member 232. In normal operation, the main motor 201 drives the leaves 112, 114 both in opening and closing, as in the first embodiment hereinabove. Then, in the event of a malfunction detected by the auxiliary control module 204, the auxiliary control module 204 is operable to control the clutch member 232 so as to engage the auxiliary motor 203 with the main motor 201. This auxiliary motor 203 is then started so as to drive the main motor 201 which in turn generates the rotation of the worm screw 120, advantageously only in the direction of closing the leaves 112, 114.

Figure 6:
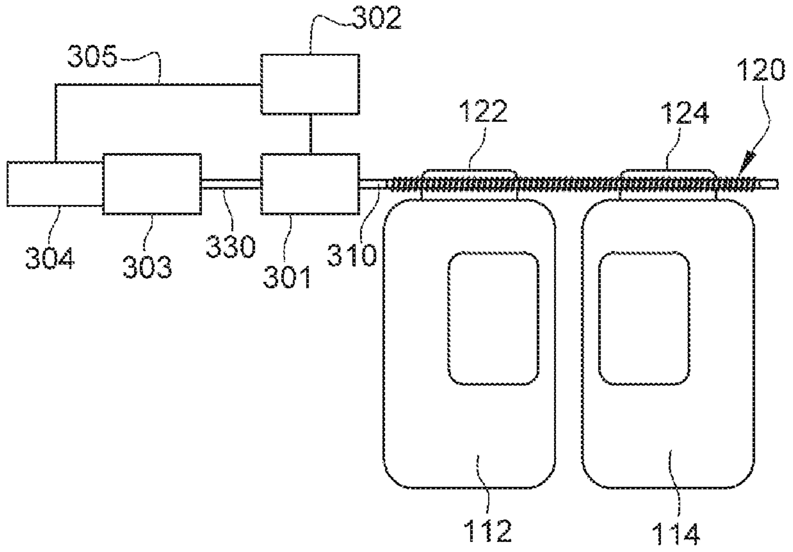
FIG. 6 is a front view, similar to FIG. 5, illustrating a control and drive assembly according to a variant of this second embodiment of the disclosure.

FIG. 6 illustrates a second embodiment, presented with reference to FIG. 5. In FIG. 6, the mechanical elements of the control and drive assembly, which are similar to those of FIG. 5, are assigned same reference numbers, increased by the number 100.

The control and drive assembly of FIG. 6 differs from that of FIG. 5 in that the main motor 301 and auxiliary motor 303 are permanently engaged, since there is no clutch member such as that in the prior embodiments. In addition, there is an additional control line connecting the main control unit 302 and the auxiliary motor 303. In normal operation, it is possible to choose to actuate only the main motor 301, or else both the main motor 301 and the auxiliary motor 303. In the event of a malfunction, similarly to what has been described hereinabove, only the auxiliary motor 303 is started so as to drive the main motor 301 and the worm screw 120.

As a variant which is not represented, provision may be made for the drive mechanism to be made in a different form of a single worm screw 120. With this in mind, each leaf 112, 114 can be equipped with a respective worm screw 120 being advantageously coupled.

Figure 7:
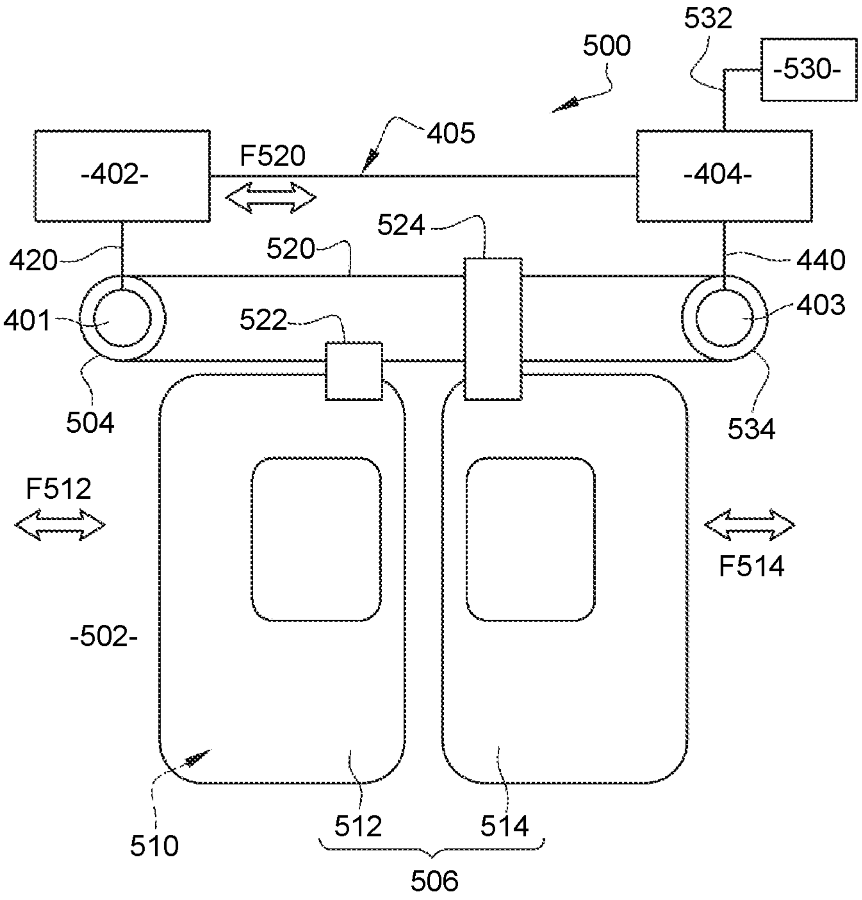
FIG. 7 is a front view, similar to FIG. 1, illustrating a control and drive assembly according to a third embodiment of the disclosure.

In the examples above, the displacement device for displacing each leave 112, 114 of the door 106 is of a worm screw and nut type. Nevertheless, the disclosure finds its application to other types of displacement devices. With this in mind, FIG. 7 illustrates a control and drive assembly associated with a displacement device which uses a pulley and belt system. In this FIG. 7 the mechanical elements similar to those of the first embodiment are assigned the same reference numbers, increased by the number 400.

As shown in FIG. 7, similarly to the first embodiment, the control and drive assembly of a transport vehicle 500 comprises a main motor 401, a main control unit 402, an auxiliary motor 403, an auxiliary control module 404, and a connection device 405 between the main control unit 402 and the auxiliary main control module 404. In FIG. 7, there is illustrated a main pulley 504 to be driven by the main motor 401. This pulley 504 meshes with a belt 520, which is wound around an auxiliary pulley 534, provided in the vicinity of the auxiliary motor 403.

In normal operation, the main motor 401 drives the main pulley 504 and the belt 520. The belt 520 supports, on each of the strands thereof, a respective displacement arm 522, 524. Each arm 522, 524 is secured to a respective leaf 512, 514 of the door 506 such that, when the belt 520 is moved according to the double arrow F520, the leaves 512, 514 are driven according to the double arrows F512 and F514. Preferably, the pulleys 504, 534 are operable to allow displacement of the leaves 512, 514 of the sliding plug type. To this end, the various mechanical elements are in accordance, for example, with the teaching of the French Patent No. 3 003 887. Contrary to the arrangement described in French Patent No. 3 003 887, the auxiliary pulley 534 is not permanently of the driven type. Indeed, the auxiliary pulley 534 is likely to be driven by the auxiliary motor 403. Consequently, should a malfunction within the meaning of what has been described hereinabove is detected by the auxiliary control module 404, the auxiliary control module 404 is operable to control the auxiliary motor 403. The auxiliary motor 403 then cooperates with the auxiliary pulley 534 so as to move the belt 520 and displace the leaves 522, 524. Thus, in the occurrence of such a malfunction, the auxiliary motor 403 is driving while the main motor 401 is driven. As disclosed hereinabove, however, in the context of normal operation, the main motor 401 is driving and the auxiliary motor 403 is driven.

As an additional variant (not illustrated), provision may be made for the control and drive assembly in accordance with the disclosure to cooperate with a door 106 having a single leaf. In this case, a single worm screw 120 is typically provided, similar to that previously described, but of smaller axial dimension. Such a worm screw 120 is likely to mesh with the main motor 1 and, in the case of failure of the main motor 1, with the auxiliary motor 3 as explained hereinabove.

The disclosure has many advantages, relative to the prior art. It will be noted first of all that the disclosure allows solving, in a reliable manner, malfunctions occurring not only at the main control unit, but also at the main motor. Indeed, the auxiliary control module can be notified of such an abnormal operation, both at the control unit and the main motor, when this auxiliary control module notes the absence of transmission of the reference signal. This should be compared with the prior art which, as explained above, does not allow taking into account possible problems at the main motor.

Moreover, the disclosure provides a reliable solution to these malfunctions, without, however, involving significant additional costs. Indeed, according to the disclosure, provision is made for the speed of displacement of the leaf, in a rescue case, to be much lower than the displacement speed thereof in the context of a normal operation. Under these conditions, the auxiliary motor advantageously has performance and, consequently, a cost price which is significantly less than that of the main motor. Furthermore, as mentioned above, provision is advantageously made for the auxiliary control module and the auxiliary motor to be dedicated solely to the functions of closing and, where appropriate, locking the leaves. With this in mind, it is possible in particular to use, as an auxiliary module, a microcontroller or else a complex programmable logic device (CPLD).

By comparison, it should be emphasized that the arrangement proposed by German Patent Publication No. DE 199 13 996 uses the same types of mechanical elements, both for the displacement under normal conditions and for the displacement in the case of an emergency. Under these conditions, an emergency situation is certainly managed reliably, but at the cost of a significant additional cost. The latter is translated into practice, not only in terms of mechanical investments, but also of energy expenditure.

In this respect it shall be noted that the rescue closing, carried out by the disclosure, corresponds to a backup situation which is far distinct from the emergency situation monitored by German Patent Publication No. DE 199 13 996. Indeed, in the disclosure, there is no real emergency linked to the door closing, so long as this closing is actually carried out. According to the disclosure, it is therefore possible to carry out this rescue or backup closing with a low energy. Indeed, in this situation, the leaf is displaced at a low speed, significantly lower than the displacement speed thereof in a normal situation.

Under these conditions, the disclosure implies substantially no risk of injuring a passenger, following a possible impact with this slowly mobilized leaf. This is to be compared with the solution of German Patent Publication No. DE 199 13 996 which provides for identical motors, both in normal operation and in the case of a rescue closing which corresponds to an emergency closing. In these conditions, the risk of injury to a passenger is significant given that, in an emergency situation, the leaf is mobilized at the same speed as in a normal situation.

It will be noted that the fact of providing an auxiliary module, according to the disclosure, has specific advantages relative to a solution which would use a single control module. Indeed, in the event of failure of such a single module, the door 106 would no longer be operational, which could then cause a prolonged stop of the transport vehicle. On the contrary, an auxiliary control allows, in accordance with the disclosure, preserve a backup operation of the door 106, which avoids any paralysis of the transport vehicle.

Finally, it should be emphasized that the auxiliary motor, used in accordance with the disclosure, cannot be the cause of an inadvertent maneuver in normal operation of the door. Indeed, in the context of such a normal operation, this auxiliary motor is inactive relative to the leaf displacement device.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A control and drive assembly for a vehicle door, the control and drive assembly comprising:

a main control unit having an electronic control device;

a main motor operable to drive leaves of the door, the main control unit operable to control the main motor to displace the leaves in opposite directions corresponding to opening and closing of the leaves;

an auxiliary control module;

an auxiliary motor, the auxiliary control module operable to control the auxiliary motor to displace the leaves in at least one direction of the opposite directions to a closed position, control a locking of the leaves in the closed position, and displace the leaves at an auxiliary displacement speed having an upper value that is less than an upper value of a first displacement speed allowed by the main motor; and a connection device arranged between the main control unit and the auxiliary control module to facilitate transmission of a reference signal by the main control unit to the auxiliary control module, the reference signal representative of a proper operating state of the main motor, the main control unit, and the electronic control device, wherein the auxiliary control module is operable to actuate the auxiliary motor responsive to the auxiliary control module not receiving the reference signal.

2. The control and drive assembly of claim 1, wherein a ratio of the upper value of the first displacement speed allowed by the main motor to the upper value of the auxiliary displacement speed is greater than 1.5.

3. The control and drive assembly of claim 1, wherein a ratio of the upper value of the first displacement speed allowed by the main motor to the upper value of the auxiliary displacement speed is between 1.5 and 3.

4. The control and drive assembly of claim 1, wherein the upper value of the auxiliary displacement speed is less than 0.5 meters per second.

5. The control and drive assembly of claim 1, wherein an upper energy output of the auxiliary motor is less than 18 Joules.

6. The control and drive assembly of claim 1, wherein the auxiliary control module is operable to actuate the auxiliary motor responsive to the auxiliary control module no longer receiving signals from the main control unit.

7. The control and drive assembly of claim 1, wherein the auxiliary control module is operable to actuate the auxiliary motor responsive to the auxiliary control module receiving a first signal from the main control unit which is different than the reference signal.

8. The control and drive assembly of claim 1, wherein the auxiliary control module is operable to control the auxiliary motor to displace the leaves in a single direction to the closed position.

9. The control and drive assembly of claim 1, wherein the connection device comprises a wired connection device operable to transmit the reference signal as a variable periodic signal.

10. The control and drive assembly of claim 1, wherein the connection device comprises a wired connection device operable to transmit the reference signal as a variable incremental signal.

11. A method for implementing a control and drive assembly of claim 1, the method comprising:

controlling, via the control unit, the main motor according to a nominal displacement speed to carry out each opening and closing cycle of the leaves responsive to the auxiliary control module receiving the reference signal representative of a proper operating state of the main motor, the main control unit, and the electronic control device, while leaving the auxiliary motor in an inactive state; and controlling the auxiliary motor, via the auxiliary control module in response to the auxiliary control module detecting an absence of reception of the reference signal to close the leaves according to the auxiliary displacement speed.

12. The method of claim 11, further comprising entering into an initialization phase in which the reference signal is transmitted via the main control unit at least once to the auxiliary control module before carrying out an initial opening cycle and closing cycle of the leaves.

13. The method of claim 11, wherein, after detecting the absence of reception of the reference signal via the auxiliary module, detecting a time delay phase before controlling the auxiliary motor via the auxiliary module.

14. A transport vehicle, comprising:

a door having leaves moveable between an open position and a closed position;

a control and drive assembly for the door, the control and drive assembly including:

a main control unit having electronic control device;

a main motor operable to drive the leaves, the main control unit being operable to control the main motor so as to displace the leaves in opposite directions corresponding to an opening and a closing of the leaves;

an auxiliary control module;

an auxiliary motor, the auxiliary control module operable to control the auxiliary motor to displace the leaves to the closed position, control a locking of the leaves in the closed position, and displace the leaves at an auxiliary displacement speed having an upper value that is less than an upper value of a displacement speed allowed by the main motor; and a connection device arranged between the main control unit and the auxiliary control module to facilitate transmission of a reference signal by the main control unit to the auxiliary control module, the reference signal representative of a proper operating state of the main motor, the main control unit, and the electronic control device, wherein the auxiliary control module is operable to actuate the auxiliary motor responsive to the auxiliary control module not receiving the reference signal.

15. A transport vehicle of claim 14, wherein the transport vehicle comprises a train, a tram, a metro vehicle, a bus, or a trolleybus.

* * * * *